Sept. 9, 1930. E. W. BALDWIN ET AL 1,775,268
TRACTOR HITCH
Filed June 27, 1927
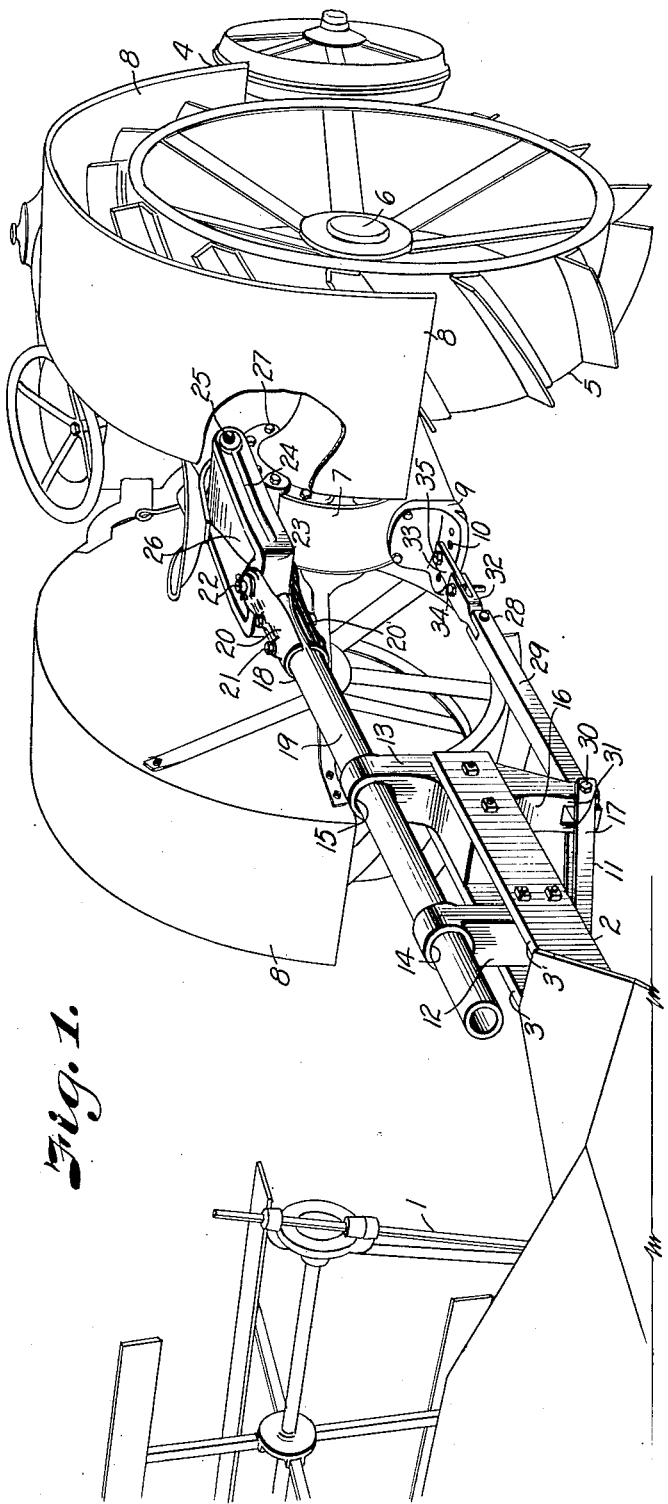
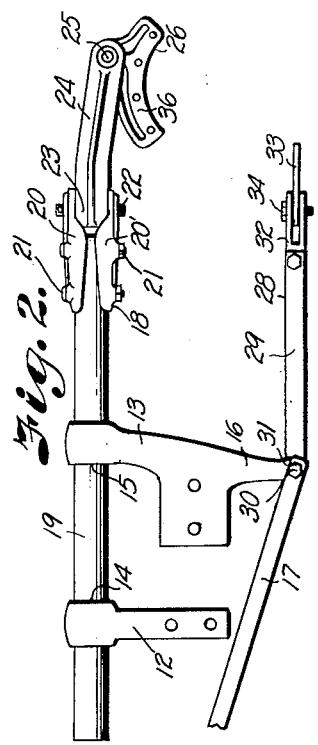
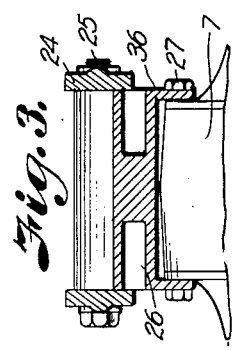
INVENTOR
Ernest W. Baldwin
and George D. Baldwin
BY Arthur C. Brown
ATTORNEY Patented Sept. 9, 1930

1,775,268

UNITED STATES PATENT OFFICE

ERNEST W. BALDWIN AND GEORGE D. BALDWIN, OF INDEPENDENCE, MISSOURI, ASSIGNORS, BY MESNE ASSIGNMENTS, TO THE GLEANER COMBINE HARVESTER CORPORATION, OF INDEPENDENCE, MISSOURI, A CORPORATION OF DELAWARE

TRACTOR HITCH

Application filed June 27, 1927. Serial No. 201,791.

Our invention relates to tractors, and more particularly to hitching means for engaging a tractor with an implement or trailer.

Our purpose is to provide a device whereby part of the weight of an implement being hauled may be carried by the tractor independently of but cooperatively with the draft means, and whereby pivotal connections will permit short turns by the tractor and the implement.

The problem presented may be illustrated with reference to a type of tractor having sufficient power to pull heavy implements, but lacking weight to enforce the draft. We provide, as accomplishing our purpose, a supporting member having a shaft slidable in bearings installed on the forward part of an implement from which the front wheels may be removed and a yoke vertically pivotal on the transmission housing of the tractor, the yoke and shaft being horizontally pivoted at a point adjacent the axle of the tractor, and a draw-bar member having a pivotal connection aligned with the vertical pivot of the supporting member.

Our invention will be more particularly described with references to the drawings in which:

Fig. 1 is a perspective view of a tractor equipped with our invention and hitched to an implement.

Fig. 2 is a detail elevation of the hitching device.

Fig. 3 is a sectional view of the yoke element of the supporting member on the line 3—3, Fig. 1.

Referring in detail to the drawings:

1 designates generically a piece of farm machinery, for example, a combined harvester and thresher, of the type requiring a large amount of traction in the pulling factor, 2 designates the draft tongue of the implement which in the machine illustrated comprises bars 3 and 3', the front wheels of the implement having been removed for hitching it to a tractor by means such as we shall describe to be attached to the bars. 4 designates a tractor of usual construction, having the conventional features including the tractor wheels 5 mounted on the axle 6, and the differential housing 7 centrally positioned on the axle. The wheel guards 8 are also shown as usual. A draw bar bracket 9 having openings 10 is fixed to the tractor below the axle plane and associated with the differential housing.

Our invention will be shown as applied to a structure such as thus indicated, and comprises three significant elements which will be appropriately designated and described, namely, a supporting element, a drawing element, and means of securing the supporting and drawing elements to the implement.

The securing means 11 comprises standards 12 and 13 fixed and stabilized between the bars 3 and 3' extending forwardly from the implement and having aligned cylindrical openings 14 and 15 disposed on the longitudinal axis of the implement, the forward standard 13 having a depending arm 16 braced to the implement by reinforcing members 17. The supporting element 18 comprises a cylindrical shaft 19 slidably mounted in the openings 14 and 15 of the standards and extending forwardly, its anterior end secured in clamps 20 and 21' by bolts 21, the clamps being pivotally connected by the pin 22 for horizontal oscillation of the shaft in relation to the tractor, on the yoke 23, the arms 24 of which are pivoted at 25 for vertical oscillation in a saddle 26 fixed on the differential housing by selected bolts 27 of the housing assembly.

The supporting element as described is adapted to enable the tractor to receive and bear a part of the weight of the implement, whereby the traction ability of the tractor is enhanced, and the well known disadvantages of the hitching of a high powered tractor of light weight to a heavy draft implement are compensated. This feature of our device represents an improvement on means otherwise adaptable for the purpose, in one respect that the supporting element is provided with means, namely the horizontal pivoting arrangement, whereby the supporting element 18 is permitted to swing on a substantial arc, upon diversion of course by the tractor, without contacting the wheel guards, and a shorter turn is therefore possible for the tractor and the drawn implement. The pivoting of the yoke in a saddle on the differential housing permits vertical oscillation of the supporting member. These features and the slidable mounting of the draft in the bearings that are secured to the frame, have further advantages in my disclosed structure as cooperating with the functioning of our special provision of draw bar elements which will now be described.

The draw bar element 28 comprises the bar 29 received by and pivotally mounted by a pin 30 in bearing ears 21 of the depending arm 16 of the standard 15 for vertical oscillation, the clevis 32 pivoted in the anterior end of the bar and the coupling link 33 received by the clevis and retained by the coupling pin 34, the link being engaged with the draw bar bracket by the pin 35 projected through the link into a selected opening 10 of the bracket.

The structure described therefore provides that the lateral pivoting of the draw bar element occurs at a point substantially spaced rearwardly from the axle of the tractor, and we specially provide that the lateral pivot means of the draw bar is positioned vertically aligned with the lateral pivot of the supporting element for the co-operation of the two elements.

The slidable mounting of the supporting element provides that said element sustains no hauling stress, such as would tend to overbalance and tip the tractor. The independent draft means, having no vertical load to carry, may be designed exclusively for its particular function and may also function more efficiently because unimpeded in vertical or horizontal oscillation by a burden of weight.

It should be noted that the saddle member is provided with an arcuate free face 36 to permit rocking of the yoke branches thereover, a condition disclosed in Fig. 3 as the spacing of the yoke arm ends from the bolts by which the saddle is secured to the transmission casing.

What we claim and desire to secure by Letters Patent is:

1. In combination with draft and trailer units, a bearing on the trailer unit, a saddle member on the draft unit, a supporting member including a bar rotatably mounted in said bearing, a yoke pivoted to the bar and having transverse pivotal connection with the saddle, and a draw bar connecting the units independently of said supporting member and having a vertical pivotal joint in vertical alignment with the pivotal connection between the bar and the yoke.

2. In apparatus of the character described including a draft unit, a trailer unit, a bearing on the trailer unit, a saddle member on the draft unit, and a supporting bar rotatably mounted in said bearing, a yoke having vertical pivotal connection with the bar and transverse pivotal connection with the saddle, and a draw bar connecting the units including members having vertical pivotal connection in vertical alignment with the pivotal connection between the bar and the yoke.

3. In apparatus of the character described including a draft unit, a trailer unit, a horizontal bearing on the trailer unit, a saddle member on the draft unit, and a supporting bar rotatably and slidably mounted in said bearing, a yoke having vertical pivotal connection with the bar and transverse pivotal connection with the saddle, a draw bar connected with the trailer unit in spaced relation with the supporting bar, a link pivotally connected with the draft unit, and a clevis connecting the draw bar with said link and having a vertical pivot in vertical alignment with the pivotal connection between the supporting bar and the yoke.

In testimony whereof we affix our signatures.

ERNEST W. BALDWIN.
GEORGE D. BALDWIN.